(12) United States Patent
Gümbel et al.

(10) Patent No.: US 6,680,412 B2
(45) Date of Patent: Jan. 20, 2004

(54) ALCOHOL ALKOXYLATES USED AS LOW-FOAM, OR FOAM INHIBITING SURFACTANTS

(75) Inventors: Helmut Gümbel, Dannenfels (DE); Martin aus dem Kahmen, Ludwigshafen (DE); Norbert Wagner, Mutterstadt (DE); Klaus Taeger, Freinsheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/239,884

(22) PCT Filed: Apr. 4, 2001

(86) PCT No.: PCT/EP01/03850

§ 371 (c)(1), (2), (4) Date: Oct. 7, 2002

(87) PCT Pub. No.: WO01/77276

PCT Pub. Date: Oct. 18, 2001

(65) Prior Publication Data

US 2003/0092587 A1 May 15, 2003

(30) Foreign Application Priority Data

Apr. 7, 2000 (DE) .......................... 100 17 197

(51) Int. Cl.$^7$ .......................... C07C 41/00; C11D 17/00
(52) U.S. Cl. .......................... 568/672; 510/443; 510/535; 510/360; 510/413; 510/422; 510/506
(58) Field of Search .......................... 568/672; 510/443, 510/413, 422, 506, 360

(56) References Cited

U.S. PATENT DOCUMENTS

| | | | |
|---|---|---|---|
| 3,956,401 A | * | 5/1976 | Scardera et al. |
| 4,317,940 A | * | 3/1982 | Scardera et al. |
| 4,827,028 A | | 5/1989 | Scardera et al. |
| 5,294,365 A | | 3/1994 | Welch et al. |
| 5,705,476 A | * | 1/1998 | Hoffarth ............ 510/535 |
| 5,766,371 A | | 6/1998 | Bunch et al. |

FOREIGN PATENT DOCUMENTS

| | | |
|---|---|---|
| EP | 0 681 865 | 11/1995 |
| WO | 96 12001 | 4/1996 |

* cited by examiner

Primary Examiner—Alan L. Rotman
Assistant Examiner—Héctor M. Reyes
(74) Attorney, Agent, or Firm—Oblon, Spivak, McClelland, Maier & Neustadt, PC

(57) ABSTRACT

Alcohol alkoxylates of the formula (I)

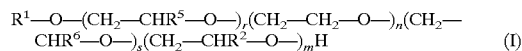

$$R^1-O-(CH_2-CHR^5-O-)_r(CH_2-CH_2-O-)_n(CH_2-CHR^6-O-)_s(CH_2-CHR^2-O-)_mH \quad (I)$$

where
$R^1$ is an at least singly branched $C_{4-22}$-alkyl
$R^2$ is $C_{3-4}$-alkyl
$R^5$ is $C_{1-4}$-alkyl
$R^6$ is methyl or ethyl
n is an average value from 1 to 50
m is an average value from 0 to 20
r is an average value from 0 to 50
s is an average value from 0 to 50,
where m is at least 0.5 if $R^5$ is methyl or ethyl or r is 0,
or alcohol alkoxylates of the formula (II)

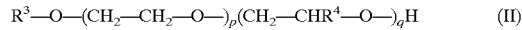

$$R^3-O-(CH_2-CH_2-O-)_p(CH_2-CHR^4-O-)_qH \quad (II)$$

where
$R^3$ is branched or unbranched $C_{4-22}$-alkyl
$R^4$ is $C_{3-4}$-alkyl
p is an average value of from 1 to 50
q is an average value of from 0.5 to 20
are used as low-foam or foam-suppressing surfactants.

21 Claims, No Drawings

ALCOHOL ALKOXYLATES USED AS LOW-FOAM, OR FOAM INHIBITING SURFACTANTS

BACKGROUND OF THE INVENTION

1. Field of the Invention

The invention relates to alcohol alkoxylates and mixtures thereof which can be used as low-foam or foam-suppressing surfactants, for example in detergents and cleaners and in formulations for chemicotechnological applications, and to detergents and cleaners comprising them.

2. Description of the Background

Low-foam or foam-suppressing surfactants from ethoxylated and propoxylated alcohols are known per se. U.S. Pat. No. 5,766,371 relates to biodegradable low-foam surfactants which can be used as rinse aids in dishwashing detergents. It describes $C_{4-18}$-alkanols reacted firstly with propylene oxide and then with ethylene oxide and finally with a $C_{4-8}$-alkylene oxide.

U.S. Pat. No. 5,294,365 relates to hydroxypolyethers which can be used as low-foam surfactants. Here, $C_{1-18}$-alcohols are firstly reacted with ethylene oxide, then with propylene oxide and then with glycidyl ethers.

U.S. Pat. No. 4,827,028 relates to anionic surfactants obtained by reacting $C_{1-8}$-alcohols with ethylene oxide, then propylene oxide and then an alkylene oxide having at least 8 carbon atoms. The order of the reaction with propylene oxide and ethylene oxide can also be reversed.

WO 96/12001 relates to biodegradable surfactants which can be used as rinse aids. The surfactants are predominantly obtained by reacting $C_{4-18}$-alcohols with propylene oxide, then ethylene oxide and then $C_{4-18}$-alkylene oxides. The examples also describe the reaction of $C_{6-10}$-alcohols with at least 20 mol of ethylene oxide and then butylene oxide or decylene oxide.

The known low-foam surfactants do not have a suitable combination of properties of foam suppression, wetting action and ability to be formulated which is suitable for all applications.

The known surfactants sometimes also have a relatively high ecotoxicological hazard potential, in particular toward aquatic organisms.

SUMMARY OF THE INVENTION

It is an object of the present invention, therefore, to provide alcohol alkoxylates which have an improved spectrum of properties and can, in particular, be used as low-foam and foam-suppressing surfactants. They should be suitable, in particular, for use in detergents and cleaners and for chemicotechnological applications.

We have found that this object is achieved according to the invention by alcohol alkoxylates of the formula (I)

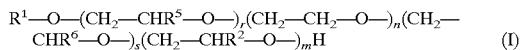

(I)

where
$R^1$ is an at least singly branched $C_{4-22}$-alkyl
$R^2$ is $C_{3-4}$-alkyl
$R^5$ is $C_{1-4}$-alkyl
$R^6$ is methyl or ethyl
n is an average value from 1 to 50
m is an average value from 0 to 20, preferably 0.5 to 20
r is an average value from 0 to 50
s is an average value from 0 to 50,
where m is at least 0.5 if $R^5$ is methyl or ethyl or r is 0.

The object is also achieved according to the invention by a mixture comprising 20 to 95% by weight, preferably 30 to 95% by weight, of at least one of the above alcohol alkoxylates and 5 to 80% by weight, preferably 5 to 70% by weight, of a corresponding alcohol alkoxylate but in which $R^1$ is an unbranched alkyl radical with the same number of carbon atoms.

The object is also achieved by alcohol alkoxylates of the formula (II)

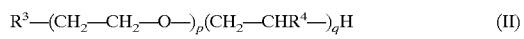

(II)

where
$R^3$ is branched or unbranched $C_{4-22}$-alkyl
$R^4$ is $C_{3-4}$-alkyl
p is an average value of from 1 to 50, preferably 4 to 15
q is an average value of from 0.5 to 20, preferably 0.5 to 4, more preferably 0.5 to 2.

DETAILED DESCRIPTION OF THE PREFERRED EMBODIMENTS

The object is also achieved by mixtures comprising 5 to 95% by weight of at least one branched alcohol alkoxylate (II), as described immediately above, and 5 to 95% by weight of a corresponding alcohol alkoxylate but in which an unbranched alkyl radical is present instead of a branched alkyl radical.

In the alcohol alkoxylates of the formula (I), $R^2$ is preferably propyl, in particular n-propyl.

In the alcohol alkoxylates of the formula (I), n preferably has an average value of from 4 to 15, particularly preferably 6 to 12, in particular 7 to 10.

m preferably has an average value of from 0.5 to 4, particularly preferably 0.5 to 2, in particular 1 to 2. The expression "average value" refers to technical-grade products in which differing numbers of alkylene oxide units may be present in the individual molecules. It describes the proportion of corresponding alkylene oxide units which are on average present in technical-grade products. A value of 0.5 therefore means that, on average, every second molecule carries a corresponding unit. Instead of the lower limit of 0.5, according to a preferred embodiment of the invention, the lower limit for the indices n, m, p and q is 1.

r is preferably 0. s is preferably 0.

The radical $R^1$ is preferably a $C_{8-15}$—, particularly preferably a $C_{8-13}$—, in particular a $C_{8-12}$-alkyl radical which is at least singly branched. Two or more branches may also be present.

$R^5$ is preferably methyl or ethyl, in particular methyl.
$R^6$ is preferably ethyl.

The mixtures contain compounds with unbranched and with branched alcohol radicals $R^1$. This is the case, for example, in the case of oxo alcohols which have a proportion of linear alcohol chains and a proportion of branched alcohol chains. For example, a $C_{13/15}$-oxo alcohol frequently has about 60% by weight of completely linear alcohol chains, but in addition also about 40% by weight of α-methyl-branched and $C_{\geq 2}$-branched alcohol chains.

In the alcohol alkoxylates of the formula (II), $R^3$ is preferably a branched or unbranched $C_{8-5}$-alkyl radical, particularly preferably a branched or unbranched $C_{8-13}$-alkyl radical and in particular a branched or unbranched $C_{8-12}$-alkyl radical.

$R^4$ is preferably propyl, in particular n-propyl. p preferably has an average value of from 4 to 15, particularly preferably an average value of from 6 to 12 and in particular an average value of from 7 to 10. q preferably has an average value of from 0.5 to 4, particularly preferably 0.5 to 2, in particular 1 to 2.

Analogously to the alcohol alkoxylates of the formula (I), the alcohol alkoxylates of the formula (II) can also be present as mixtures containing unbranched and branched alcohol radicals.

Suitable alcohol components on which the alcohol alkoxylates according to the invention are based are not only pure alkanols, but also homologous mixtures with a range of carbon atoms. Examples are $C_{8/10}$-alkanols, $C_{10/12}$-alkanols, $C_{13/15}$-alkanols, $C_{12/15}$-alkanols. Mixtures of two or more alkanols are also possible.

The above alkanol alkoxylates or mixtures according to the invention are preferably prepared by reacting alcohols of the formula $R^1$—OH or $R^3$—OH or mixtures of corresponding branched and unbranched alcohols optionally firstly with $C_{3-6}$-alkylene oxide, then with ethylene oxide and subsequently optionally with $C_{3-4}$-alkylene oxide and then a corresponding $C_{5-6}$-alkylene oxide. The alkoxylations here are preferably carried out in the presence of alkoxylation catalysts. Use is made here in particular of basic catalysts, such as potassium hydroxide. Using special alkoxylation catalysts, such as modified bentonites or hydrotalcites, as are described, for example, in WO 95/04024, the random distribution of the amounts of incorporated alkylene oxides can be severely restricted, giving "narrow-range" alkoxylates. As a result, the random distribution of the amount of alkylene oxide units in technical-grade mixtures can be severely restricted.

The alcohol alkoxylates or mixtures thereof according to the invention are preferably used in accordance with the invention as low-foam or foam-suppressing surfactants.

The low-foam or foam-suppressing surfactants according to the invention can be used in a large number of applications. They are preferably used as nonionic surfactants, preferably in detergent and cleaner formulations and in surfactant-containing formulations for chemicotechnological applications, for example for industrial and domestic cleaning processes, and for textile washing or for cleaning processes in the food sector, such as the cleaning of beverage bottles or of containers or equipment in the food-processing industry or in dishwashing detergents. In particular, the cleaning of hard surfaces made of, for example, glass, ceramic, surface coating, plastic or metal is of interest here. The surfactants are also used in industrial cleaners and in cleaning processes in the metal-processing industry.

The surfactants can also advantageously be used for a large number of other chemicotechnological processes, thus generally in the metal-processing industry, for example in cooling lubricants, hardening oils, hydraulic oil emulsions, polishing pastes, mold release agents, drawing oils, mordants, metal cleaners, metal dryers.

In this connection, surfactants may be used advantageously specifically in processes in which high thermal stability is of importance.

The surfactants can also be used in the manufacture and processing of textiles. The use of surfactants during the manufacture and processing of textiles is extremely multifaceted, extending predominantly to the areas pretreatment agents of fibers, preparation of rayon fibers, spin finishers and textile lubricants, dyeing auxiliaries, hand modifiers, hydrophobicization agents, auxiliaries for printing, antistats, flocculants and coatings.

Surfactants can also be used in the leather, paper, printing, electroplating and photographic industry. Important application fields here are surface coatings, pigments and printing inks. Surfactants are used in these application fields both in aqueous and in nonaqueous systems. In nonaqueous systems, they serve primarily as dispersion auxiliaries, anti-settling agents or flow-control agents. In addition, surfactants permit the preparation of so-called high-solids systems. Surfactants have a greater proportion in aqueous systems in which they are used not only for the stabilization of the polymer-dispersion-based binders prepared by emulsion polymerization or polycondensation, but also as dispersion auxiliaries of often used organic or inorganic pigments. In addition, they improve the adhesion properties of these coating materials.

In addition, the surfactants can be used in water treatment, for example in wastewater purification.

The surfactants can also be used in crop-protection formulations.

The compounds can also be used as surfactants or emulsifiers in the polymer-production and polymer-processing industry. The main fields of use in the production and processing of polymers are preparation of polymer dispersions, preparation of bead polymers, preparation of foams, use of surface-active mold release agents, preparation of microcapsules, improvement of the adhesion between fillers and plastics, additives to polymer dispersions for achieving particular effects, such as foamability, filler compatibility or wetting ability, emulsifiers for nonaqueous systems, coloring plastics, antistatic finishing of plastics, adhesives.

The present invention likewise provides detergent and cleaner formulations which (in addition to the customary constituents) comprise, as surfactants, 0.1 to 40% by weight, in particular 1 to 30% by weight, especially 10 to 25% by weight, based on the total amount of the formulation, of at least one compound of the formula (I) or (II) according to the invention. In addition, these formulations can also comprise further nonionic surfactants, but also cationic, anionic and/or amphoteric surfactants. The customary constituents of detergent and cleaner formulations are known to the person skilled in the art.

The alkoxylates described in most cases display an unusually low interfacial tension, especially with respect to non-polar oils such as engine oils (of importance for use in industrial cleaners), which correlates very highly with a high fat-dissolving power, is effective in reducing the surface tension and results in a very low critical micelle concentration. They usually exhibit very good wetting power on hard surfaces and very good wetting power on textile surfaces. In the wash they mostly produce little foam, which makes them suitable for textile detergents, in particular powder detergents. Even in machine and manual cleaning processes they generally produce only little foam, in most cases have a foam-suppressing action and in most cases effect rapid foam disintegration.

The alkoxylates described are readily biodegradable and largely toxicologically safe, in particular their aquatic toxicity is significantly lower than that of comparable commercial products.

The invention is illustrated in more detail by the examples below.

EXAMPLE 1

I-decanol+10 EO+1.5 Pentene Oxide

An autoclave was charged with 474 g of i-decanol (corresponding to 3.0 mol) together with 4.5 g of potassium hydroxide as alkoxylation catalyst. After a dehydration phase, 1320 g of ethylene oxide (corresponding to 30.0 mol) were gassed in continuously at 110 to 120° C. To complete the reaction, the mixture was stirred for 1 h at the same temperature. The temperature was then increased to 150° C., and 387 g of pentene oxide (corresponding to 4.5 mol) were added continuously to the reactor. Upon reaching a constant pressure, the temperature was maintained for two hours to complete the conversion. This gave 2180 g of the abovementioned product.

The substances of examples 2 to 5 were prepared analogously.

EXAMPLE NO. 2

I-decanol+10 EO+1 Pentene Oxide

EXAMPLE NO. 3

I-decanol+10 EO+2 Pentene Oxide

EXAMPLE NO. 4

I-decanol+7.3 EO+1.5 Pentene Oxide

EXAMPLE NO. 5

I-decanol+15 EO+1.5 Pentene Oxide

EXAMPLE NO. 6

$C_{13/15}$-oxo Alcohol+10 EO+2 Pentene Oxide

An autoclave was charged with 424 g of $C_{13/15}$-oxo alcohol (corresponding to 2.0 mol) together with 4.0 g of potassium hydroxide as alkoxylation catalyst. After a dehydration phase, 880 g of ethylene oxide (corresponding to 20.0 mol) were gassed in continuously at 110 to 120° C. To complete the reaction, the mixture was stirred for 1 h at the same temperature. The temperature was then increased to 155° C., and 344 g of pentene oxide (corresponding to 4 mol) were added continuously to the reactor. Upon reaching a constant pressure, the temperature was maintained for two hours to complete the conversion. This gave 1642 g of the abovementioned product.

EXAMPLE 7

$C_{8/10}$-alcohol+10 EO+2 Pentene Oxide

An autoclave was charged with 486 g of $C_{8/10}$-alcohol (corresponding to 3.0 mol) together with 5.0 g of potassium hydroxide as alkoxylation catalyst. After a dehydration phase, 1320 g of ethylene oxide (corresponding to 30.0 mol) were continuously gassed in at 110 to 120° C. To complete the reaction, the mixture was stirred for 1 h at the same temperature. The temperature was then increased to 150° C., and 516 g of pentene oxide (corresponding to 6 mol) were continuously added to the reactor. Upon reaching a constant pressure, the temperature was maintained for two hours to complete the conversion. This gave 2309 g of the abovementioned product.

EXAMPLE 8

2-ethylhexanol+10 EO+2 Pentene Oxide

An autoclave was charged with 390 g of 2-ethylhexanol (corresponding to 3.0 mol) together with 5.0 g of potassium hydroxide as alkoxylation catalyst. After a dehydration phase, 1320 g of ethylene oxide (corresponding to 30.0 mol) were gassed in continuously at 110 to 120° C. To complete the reaction, the mixture was stirred for 1 h at the same temperature. The temperature was then increased to 150° C., and 516 g of pentene oxide (corresponding to 6 mol) were added continuously to the reactor. Upon reaching a constant pressure, the temperature was maintained for two hours to complete the conversion. This gave 2214 g of the abovementioned product.

EXAMPLE 9

2-propylheptanol+10 EO+1.5 Pentene Oxide

An autoclave was charged with 316 g of 2-propylheptanol (corresponding to 2.0 mol) together with 4.0 g of potassium hydroxide as alkoxylation catalyst. After a dehydration phase, 880 g of ethylene oxide (corresponding to 20.0 mol) were gassed in continuously at 110 to 120° C. To complete the reaction, the mixture was stirred for 1 h at the same temperature. The temperature was then increased to 155° C., and 258 g of pentene oxide (corresponding to 3 mol) were added continuously to the reactor. Upon reaching a constant pressure, the temperature was maintained for two hours to complete the conversion. This gave 1440 g of the abovementioned product.

EXAMPLE 10

$C_{10/12}$-alcohol+7.6 EO+1.5 Pentene Oxide

An autoclave was charged with 81 g of $C_{10/12}$-alcohol (corresponding to 0.5 mol) together with 1.56 g of potassium hydroxide as alkoxylation catalyst. After a dehydration phase, 167.2 g of ethylene oxide (corresponding to 3.8 mol) were gassed in continuously at 110 to 120° C. To complete the reaction, the mixture was stirred for 1 h at the same temperature. 129 g of pentene oxide (corresponding to 1.5 mol) were then continuously added to the reactor at 120° C., and the temperature was increased to 150° C. Upon reaching a constant pressure, the temperature was maintained for 2 hours to complete the conversion. This gave 310 g of the substance of example 10.

The substances of examples 11 and 12 were prepared analogously.

EXAMPLE 11

$C_{10/12}$-alcohol+10 EO+1.5 pentene oxide

EXAMPLE 12

$C_{10/12}$-alcohol+10 EO+2 Pentene Oxide

EXAMPLE 13

Diethylene Glycol Butyl Ether+10 EO+6 Pentene Oxide

An autoclave was charged with 81 g of diethylene glycol butyl ether (corresponding to 0.5 mol) together with 1.5 g of potassium hydroxide as alkoxylation catalyst. After a dehydration phase, 220 g of ethylene oxide (corresponding to 5.0 mol) were continuously gassed in at 110 to 120° C. To complete the reaction, the mixture was stirred for 1 h at the same temperature. 258 g of pentene oxide (corresponding to 3.0 mol) were then continuously added to the reactor at 120° C., and the temperature was increased to 150° C. Upon reaching a constant pressure, the temperature was maintained for 2 hours to complete the conversion. This gave 560 g of the substance of example 13.

EXAMPLE 14

Ethylene Glycol Hexyl Ether+12 EO+4 Pentene Oxide

An autoclave was charged with 73 g of ethylene glycol hexyl ether (corresponding to 0.5 mol) together with 1.3 g of potassium hydroxide as alkoxylation catalyst. After a dehydration phase, 264 g of ethylene oxide (corresponding to 6.0 mol) were continuously gassed in at 110 to 120° C. To complete the reaction, the mixture was stirred for 1 h at the same temperature. 172 g of pentene oxide (corresponding to 2.0 mol) were then continuously added to the reactor at 120° C., and the temperature was increased to 150° C. Upon reaching a constant pressure, the temperature was maintained for 2 hours to complete the conversion. This gave 510 g of the substance of example 14.

EXAMPLE 15

$C_{11}$-alcohol+10 EO+2 Pentene Oxide

An autoclave was charged with 344 g of $C_{11}$-alcohol (corresponding to 2.0 mol) together with 3.1 g of potassium hydroxide as alkoxylation catalyst. After a dehydration phase, 880 g of ethylene oxide (corresponding to 20.0 mol) were continuously gassed in at 110 to 120° C. To complete the reaction, the mixture was stirred for 1 h at the same temperature. The temperature was then increased to 150° C., and 344 g of pentene oxide (corresponding to 4.0 mol) were continuously added to the reactor. Upon reaching a constant pressure, the temperature was maintained for two hours to complete the conversion. This gave 1541 g of the substance of example 15.

The substance of example 16 was prepared analogously.

EXAMPLE 16

$C_{12/15}$-alcohol+12 EO+2 Pentene Oxide

EXAMPLE 17

2-butyloctanol+10 EO+1.5 Pentene Oxide

An autoclave was charged with 372 g of 2-butyloctanol (corresponding to 2.0 mol) together with 3.8 g of potassium hydroxide as alkoxylation catalyst. After a dehydration phase, 880 g of ethylene oxide (corresponding to 20.0 mol) were continuously gassed in at 110 to 120° C. To complete the reaction, the mixture was stirred for 1 h at the same temperature. The temperature was then increased to 150° C., and 258 g of pentene oxide (corresponding to 3.0 mol) were continuously added to the reactor. Upon reaching a constant pressure, the temperature was maintained for two hours to complete the conversion. This gave 1510 g of the substance of example 17.

The substances of examples 18 and 19 were prepared analogously.

EXAMPLE 18

2-hexyldecanol+11 EO+2 Pentene Oxide

EXAMPLE 19

2-octyldodecanol+12 EO+2 Pentene Oxide

EXAMPLE 20

I-decanol+1.5 Pentene Oxide+6 EO+3 PO

An autoclave was charged with 237 g of i-decanol (corresponding to 1.5 mol) together with 2.7 g of potassium hydroxide as alkoxylation catalyst. After a dehydration phase, 193.5 g of pentene oxide (corresponding to 2.25 mol) were added continuously to the reactor, and the temperature was increased to 150° C. To complete the reaction, the mixture was maintained for 2 h at the same temperature. The temperature was then reduced to 120 to 130° C., and 396 g of ethylene oxide (corresponding to 9.0 mol) were continuously gassed in. To complete the reaction, the mixture was again stirred for 1 h. Then, at the same temperature, 261.5 g of propylene oxide (corresponding to 4.5 mol) were continuously gassed in. Upon reaching a constant pressure, the temperature was maintained for 1.5 h to complete the conversion. This gave 1088 g of the substance of example 20.

EXAMPLE 21

I-decanol+1.5 Pentene Oxide+8 EO+2 BuO

An autoclave was charged with 237 g of i-decanol (corresponding to 1.5 mol) together with 2.9 g of potassium hydroxide as alkoxylation catalyst. After a dehydration phase, 193.5 g of pentene oxide (corresponding to 2.25 mol) were added continuously to the reactor, and the temperature was increased to 150° C. To complete the reaction, the mixture was maintained at the same temperature for 2 h. The temperature was then reduced to 120 to 130° C., and 528 g of ethylene oxide (corresponding to 12.0 mol) were continuously gassed in. To complete the reaction, the mixture was again stirred for 1 h. The temperature was then increased to 130 to 140° C., and 216 g of butylene oxide (corresponding to 3.0 mol) were continuously gassed in. Upon reaching a constant pressure, the temperature was maintained for 1.5 h to complete the conversion. This gave 1174 g of the substance of example 21.

EXAMPLE 22

I-decanol+1 PO+12 EO+1.5 Pentene Oxide

An autoclave was charged with 158 g of i-decanol (corresponding to 1.0 mol) together with 2.2 g of potassium hydroxide as alkoxylation catalyst. After a dehydration phase, 58 g of propylene oxide (corresponding to 1.0 mol) were continuously gassed in at 120 to 130° C. To complete the reaction, the mixture was stirred at the same temperature for 1.5 h. Then, at the same temperature, 528 g of ethylene oxide (corresponding to 12.0 mol) were continuously gassed in and, to complete the reaction, the mixture was again maintained at the same temperature for 1 h. Then, at 130° C., 129 g of pentene oxide (corresponding to 1.5 mol) were continuously added to the reactor and the temperature was increased to 150° C. Upon reaching a constant pressure, the temperature was maintained for 2 hours to complete the conversion. This gave 870 g of the substance of example 22.

EXAMPLE 23

I-decanol+12 EO+1 PO+1.5 Pentene Oxide

An autoclave was charged with 158 g of i-decanol (corresponding to 1.0 mol) together with 2.2 g of potassium hydroxide as alkoxylation catalyst. After a dehydration phase, 528 g of ethylene oxide (corresponding to 12.0 mol) were continuously gassed in at 110 to 120° C. To complete the reaction, the mixture was stirred at the same temperature for 1 h. The temperature was then increased to 130° C., and 58 g of propylene oxide (corresponding to 1.0 mol) were continuously gassed in and, to complete the reaction, the mixture was again maintained for 1.5 h at the same temperature. Then, at 130° C., 129 g of pentene oxide (corresponding to 1.5 mol) were continuously added to the reactor, and the temperature was increased to 150° C. Upon reaching a constant pressure, the temperature was maintained for two hours to complete the conversion. This gave 874 g of the substance of example 23.

EXAMPLE 24

I-decanol+14 EO+2 Hexene Oxide

An autoclave was charged with 79 g of i-decanol (corresponding to 0.5 mol) together with 1.2 g of potassium hydroxide as alkoxylation catalyst. After a dehydration phase, 308 g of ethylene oxide (corresponding to 7.0 mol) were continuously gassed in at 110 to 120° C. To complete the reaction, the mixture was stirred for 1 h at the same temperature. The temperature was then increased to 155° C., and 100 g of hexene oxide (corresponding to 1.0 mol) were continuously added to the reactor. Upon reaching a constant pressure, the temperature was maintained for two hours to complete the conversion. This gave 485 g of the substance of example 24.

The substance of example 25 was prepared analogously.

EXAMPLE 25

I-decanol+10 EO+1.2 Hexene Oxide

In examples 1 to 25, pentene oxide stands for 1,2-pentene oxide, hexene oxide stands for 1,2-hexene oxide and butylene oxide stands for 1,2-butylene oxide. The abbreviation EO stands for ethylene oxide, PO stands for propylene oxide and BuO for 1,2-butylene oxide.

In some of examples 1 to 25, use is made in the alkoxylation reaction of alcohol mixtures, the composition of which is described as follows:

i-Decanol stands for the isomeric mixture of branched $C_{10}$-alkanols which forms during the trimerization of propylene and subsequent hydroformylation.

$C_{13/15}$-oxo alcohol stands for the mixture of isomeric $C_{13}$- and $C_{15}$-alkanols which forms during the hydroformylation of mixtures of the corresponding linear 1-alkenes, i.e. α-dodecene and α-tetradecene. The resulting $C_{13}$ and $C_{15}$-alkanols are linear or have a maximum of one branch.

2-Propylheptanol stands for a mixture of $C_{10}$-alkanols which comprises 80–100% by weight of the isomer 2-propylheptanol.

$C_{8/10}$-alcohol stands for a commercially available mixture of linear octanol and linear decanol.

$C_{10/12}$-alcohol stands for a commercially available mixture of linear decanol and linear dodecanol.

$C_{11}$-alcohol stands for a commercially available mixture of isomeric $C_{11}$-alkanols which additionally comprises, as secondary components with a cumulative content of not more than 10% by weight overall, corresponding isomeric $C_{10}$- and $C_{12}$-alkanols. The mixture comprises 40 to 60% by weight of linear alkanols and 40 to 60% by weight of alkanols which have one branch.

$C_{12/15}$-alcohol stands for a commercially available mixture of isomeric $C_{12}$-, $C_{13}$-, $C_{14}$- and $C_{15}$-alkanols. The mixture comprises 30 to 50% by weight of linear alkanols and 50 to 70% by weight of alkanols which have one branch.

The example compounds were subjected to an application-related assessment. For this, the cloud points, the surface tension, the wetting action and the foam suppression were investigated.

The cloud point was determined in accordance with DIN 53 917 in diethylene glycol butyl ether. Here, the temperature above which the solution becomes cloudy and thus is in the form of a mixture of two liquid phases was determined.

The surface tension was determined in accordance with DIN 53 914 by measuring the force, in mN/m, which is necessary to withdraw a plate or horizontally suspended ring out from the surface of the liquid.

The wetting action (wetting power) was determined in accordance with DIN 53 901 in the form of immersion wetting power. In this method, a small round disk of fabric made of cotton is immersed into the aqueous surfactant solution. The parameter measured is the time in seconds (s) between the small fabric disk being immersed and its starting to sink. The shorter this time, the better the wetting action of the surfactant in question.

The foam-suppressing behavior in the dishwashing machine was tested by the so-called "stage egg test". Here, the number of revolutions (rpm) of a spray arm in a commercially available laboratory instrument washer is determined in a computer by magnetic induction measurement and documented. As a result of the formation of foam, which occurs particularly in the presence of proteins (egg white), the repulsion force is reduced, as a result of which the number of revolutions of the spray arm decreases. The number of revolutions is thus a measure of the usefulness of surfactants in cleaning appliances with high mechanics. To carry out the test of the foam-suppression behavior, not only is the surfactant to be tested added to the wash liquor, but also a defined amount of egg and an alkaline, surfactant-free base cleaner formulation. The test time is 30 min, during which the liquor is heated in stages to firstly 30° C., then 40, 50 and finally 60° C., and the temperature is kept constant at each temperature stage for 5 min. At each temperature stage, a certain value of the number of revolutions is established within 5 min. The foam suppression given in tables 1 and 2 gives the average of the four numbers of revolutions obtained at the various temperature stages.

The application-related data are summarized in the tables below.

TABLE 1

Alkoxylates of the formula (I)

| Example No. | R¹ | R² | R⁵ | R⁶ | r | n | s | m | Cloud point [°C.] | Surface tension [mN/m] | Wetting action [s] | Foam suppression [rpm] |
|---|---|---|---|---|---|---|---|---|---|---|---|---|
| 1 | iso-$C_{10}$-Alkyl | n-Propyl | | | — | 10 | — | 1.5 | 38 | 29.3 | 13 | 112 |
| 2 | iso-$C_{10}$-Alkyl | n-Propyl | | | — | 10 | — | 1 | 48 | 28.2 | 22 | 88 |
| 3 | iso-$C_{10}$-Alkyl | n-Propyl | | | — | 10 | — | 2 | 32 | 29.3 | 18 | 112 |
| 4 | iso-$C_{10}$-Alkyl | n-Propyl | | | — | 7.3 | — | 1.5 | 32.5 | 28.9 | 24 | 88 |
| 5 | iso-$C_{10}$-Alkyl | n-Propyl | | | — | 15 | — | 1.5 | 55.5 | 30.2 | 47 | 48 |
| 6 | $C_{13}C_{15}$-Alkyl | n-Propyl | | | — | 10 | — | 2 | 32.5 | 29 | 55 | 112 |
| 8 | 2-Ethylhexyl | n-Propyl | | | — | 10 | — | 2 | 31 | 31.1 | 23 | 89 |
| 9 | 2-Propylheptyl | n-Propyl | | | — | 10 | — | 1.5 | 37 | 28 | 21 | 104 |
| 15 | $C_{11}$-Alkyl | n-Propyl | | | — | 10 | — | 2 | 33 | 28.1 | 21 | 129 |
| 16 | $C_{12}C_{15}$-Alkyl | n-Propyl | | | — | 12 | — | 2 | 38 | 28.7 | 17 | 107 |
| 17 | 2-Butyloctyl | n-Propyl | | | — | 10 | — | 1.5 | 35.5 | 28.2 | 31 | 126 |
| 18 | 2-Hexyldecyl | n-Propyl | | | — | 11 | — | 2 | 30.5 | 28.7 | 83 | 118 |
| 19 | 2-Octyldodecyl | n-Propyl | | | — | 12 | — | 2 | 33.5 | 30.7 | 213 | 111 |
| 20 | iso-$C_{10}$-Alkyl | | n-Propyl | Methyl | 1.5 | 6 | 3 | — | 43.5 | 28.1 | 21 | 67 |
| 21 | iso-$C_{10}$-Alkyl | | n-Propyl | Ethyl | 1.5 | 8 | 2 | — | 36.5 | 28.5 | 23 | 98 |
| 22 | iso-$C_{10}$-Alkyl | n-Propyl | Methyl | | 1 | 12 | — | 1.5 | 43 | 28.3 | 25 | 110 |
| 23 | iso-$C_{10}$-Alkyl | n-Propyl | | Methyl | — | 12 | 1 | 1.5 | 42.5 | 29.2 | 23 | 113 |
| 24 | iso-$C_{10}$-Alkyl | n-Butyl | | | — | 14 | — | 2 | 29 | 29.9 | 37 | 118 |
| 25 | iso-$C_{10}$-Alkyl | n-Butyl | | | — | 10 | — | 1.2 | 9.5 | 27.8 | 96 | 120 |

TABLE 2

Alkoxylates of the formula (II)

| Example No. | R³ | R⁴ | p | q | Cloud point [°C.] | Surface tension [mN/m] | Wetting action [s] | Foam suppression [rpm] |
|---|---|---|---|---|---|---|---|---|
| 7 | $C_8C_{10}$-Alkyl | n-Propyl | 10 | 2 | 32.5 | 29.1 | 33 | 111 |
| 10 | $C_{10}C_{12}$-Alkyl | n-Propyl | 7.6 | 1.5 | 34.5 | 29.4 | 18 | 106 |
| 11 | $C_{10}C_{12}$-Alkyl | n-Propyl | 10 | 1.5 | 39.5 | 28.8 | 16 | 108 |
| 12 | $C_{10}C_{12}$-Alkyl | n-Propyl | 10 | 2 | 32.0 | 28.5 | 38 | 118 |
| 13 | n-Butyl | n-Propyl | 12 | 6 | 27.0 | 29.5 | 32 | 103 |
| 14 | n-Hexyl | n-Propyl | 13 | 4 | 25.0 | 29.9 | 44 | 109 |

We claim:

1. An alcohol alkoxylate of formula (I)

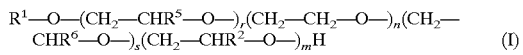

$$R^1-O-(CH_2-CHR^5-O-)_r(CH_2-CH_2-O-)_n(CH_2-CHR^6-O-)_s(CH_2-CHR^2-O-)_mH \quad (I)$$

wherein $R^1$ is at least singly branched $C_{4-22}$-alkyl, $R^2$ is $C_{3-4}$-alkyl, $R^5$ is $C_{1-4}$-alkyl, $R^6$ is methyl or ethyl, n is an average value ranging from 1 to 50, m is an average value ranging from 0 to 20, r is an average value ranging from 0 to 50 and s is an average value ranging from 0 to 50, where m is at least 0.5 if $R^5$ is methyl or ethyl or r is 0.

2. The alcohol alkoxylate as claimed in claim 1, wherein $R^5$ is methyl.

3. The alcohol alkoxylate as claimed in claim 1, wherein n has an average value ranging from 4 to 15.

4. The alcohol alkoxylate as claimed in claim 1, wherein m has an average value ranging from 0.5 to 4.

5. An alcohol alkoxylate of formula (II)

$$R^3-O-(CH_2-CH_2-O-)_p(CH_2CHR^4-O-)_qH \quad (II)$$

wherein $R^3$ is branched or unbranched $C_{4-22}$-alkyl, $R^4$ is $C_{3-4}$-alkyl, p is an average value ranging from 1 to 50, q is an average value ranging from 0.5 to 20, or a mixture comprising 5 to 95% by weight of at least one alcohol alkoxylate of the formula (II) in which $R^3$ is a branched alkyl radical, and 5 to 95% by weight of a corresponding alcohol alkoxylate but in which $R^3$ is an unbranched alkyl radical with the same number of carbon atoms.

6. The alcohol alkoxylate as claimed in claim 5, wherein $R^3$ is branched or unbranched $C_{8-15}$-alkyl and $R^4$ is propyl, and q has an average value of from 0.5 to 4.

7. A process for the preparation of alcohol alkoxylates as claimed in claim 1, comprising:
reacting an alcohol of the formula $R^1$—OH, wherein $R^1$ is as defined, optionally with $C_{3-6}$-alkylene oxide, then with ethylene oxide and subsequently optionally with $C_{3-4}$-alkylene oxide and then optionally with $C_{5-6}$-alkylene oxide.

8. A detergent or cleaner comprising 0.1 to 40% by weight, based on the total weight of the formulation, of at least one alcohol alkoxylate as claimed in claim 1.

9. A process for the preparation of alcohol alkoxylate formulation as claimed in claim 5, comprising:
reacting an alcohol of the formula $R^3$—OH, wherein $R^3$ is as defined, with ethylene oxide and subsequently with $C_{5-6}$-alkylene oxide.

10. A detergent or cleaner comprising 0.1 to 40% by weight, based on the total weight of the alcohol alkoxylate, of at least one alcohol alkoxylate as claimed in claim 5.

11. An alcohol alkoxylate formulation, comprising:
from 20 to 95% by weight of at least one alcohol alkoxylate of formula (I):

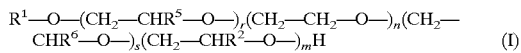

(I)

wherein $R^1$ is at least singly branched $C_{4-22}$-alkyl, $R^2$ is $C_{3-4}$-alkyl, $R^5$ is $C_{1-4}$-alkyl, $R^6$ is methyl or ethyl, n is an average value ranging from 1 to 50, m is an average value ranging from 0 to 20, r is an average value ranging from 0 to 50 and s is an average value ranging from 0 to 50, in admixture with from 5 to 80% by weight of an alcohol alkoxylate of formula (I) in which $R^1$ is an unbranched $C_{4-22}$-alkyl radical.

12. The alcohol alkoxylate formulation as claimed in claim 11, wherein $R^5$ is methyl.

13. The alcohol alkoxylate formulation as claimed in claim 11, wherein n has an average value ranging from 4 to 15.

14. The alcohol alkoxylate formulation as claimed in claim 11, wherein m has an average value ranging from 0.5 to 4.

15. An alcohol alkoxylate formulation, comprising:

from 5 to 95% by weight of at least one alcohol alkoxylate of formula (II):

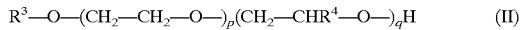

(II)

wherein $R^3$ is branched $C_{4-22}$-alkyl, $R^4$ is $C_{3-4}$-alkyl, p is an average value ranging from 1 to 50 and q is an average value ranging from 0.5 to 20; in admixture with from 5 to 95% by weight of at least one alcohol alkoxylate of formula (II) in which $R^3$ is an unbranched $C_{4-22}$-alkyl radical.

16. The alcohol alkoxylate as claimed in claim 13, wherein each of branched and unbranched $R^3$ is $C_{8-15}$-alkyl and $R^4$ is propyl, and q has an average value ranging from 0.5 to 4.

17. A process for the preparation of an alcohol alkoxylate formulation as claimed in claim 11, comprising:

reacting mixtures of alcohols of the formulas $R^1$—OH, wherein the alcohols have branched and unbranched alkyl groups and wherein $R^1$ is as defined, optionally with $C_{3-6}$-alkylene oxide, then with ethylene oxide and subsequently optionally with $C_{3-4}$-alkylene oxide and then optionally with $C_{5-6}$-alkylene oxide.

18. A detergent or cleaner comprising 0.1 to 40% by weight, based on the total weight of the formulation, of the alcohol alkoxylate mixture as claimed in claim 11.

19. A process for the preparation of alcohol alkoxylate formulation as claimed in claim 15, comprising:

reacting an alcohol of the formula $R^3$—OH, wherein $R^3$ is as defined, with ethylene oxide and subsequently with $C_{5-6}$-alkylene oxide.

20. A detergent or cleaner comprising 0.1 to 40% by weight, based on the total weight of the alcohol alkoxylate, of at least one alcohol alkoxylate as claimed in claim 15.

21. The alcohol alkoxylate as claimed in claim 11, wherein the mixture comprises from 30 to 95% by weight of the alcohol alkoxylate of formula (I) and from 5 to 70% by weight of the alcohol alkoxylate of formula (I) in which $R^1$ is unbranched $C_{4-22}$-alkyl.

* * * * *